United States Patent
Ariyoshi

(10) Patent No.: US 11,828,618 B2
(45) Date of Patent: Nov. 28, 2023

(54) MAP GENERATION APPARATUS

(71) Applicant: Honda Motor Co., Ltd., Tokyo (JP)

(72) Inventor: Tokitomo Ariyoshi, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 17/676,186

(22) Filed: Feb. 20, 2022

(65) Prior Publication Data

US 2022/0268595 A1  Aug. 25, 2022

(30) Foreign Application Priority Data

Feb. 25, 2021 (JP) ................................. 2021-028503

(51) Int. Cl.
*G01C 21/00* (2006.01)
*G01C 21/32* (2006.01)
*G01C 21/36* (2006.01)

(52) U.S. Cl.
CPC ......... *G01C 21/3815* (2020.08); *G01C 21/32* (2013.01); *G01C 21/3602* (2013.01); *G01C 21/387* (2020.08); *G01C 21/3837* (2020.08)

(58) Field of Classification Search
None
See application file for complete search history.

(56) References Cited

U.S. PATENT DOCUMENTS

2018/0231387 A1* 8/2018 Thiel ................... G01C 21/3811
2020/0108832 A1* 4/2020 Choi ..................... B60W 10/04

FOREIGN PATENT DOCUMENTS

| CN | 107662558 A | * | 2/2018 | ......... B60R 16/0231 |
| CN | 110654372 A | * | 1/2020 | ............ B60W 30/00 |
| JP | 2007140883 A | * | 6/2007 | |
| JP | 2014104853 A |   | 6/2014 | |

OTHER PUBLICATIONS

Machine translation of CN-107662558-A (Year: 2018).*
Machine translation of CN-110654372-A (Year: 2020).*
Machine translation of JP-2007140883-A (Year: 2007).*

* cited by examiner

*Primary Examiner* — Anne Marie Antonucci
*Assistant Examiner* — Kyle S Park
(74) *Attorney, Agent, or Firm* — Duft & Bornsen, PC

(57) ABSTRACT

A map generation apparatus including an electronic control unit including a microprocessor and a memory connected to the microprocessor. The microprocessor is configured to perform acquiring a map data of a first map for a current lane on which a subject vehicle travels, and generating a second map for an opposite lane opposite to the current lane by inverting the first map, based on the map data acquired.

8 Claims, 5 Drawing Sheets

MAP GENERATION APPARATUS

CROSS-REFERENCE TO RELATED APPLICATION

This application is based upon and claims the benefit of priority from Japanese Patent Application No. 2021-028503 filed on Feb. 25, 2021, the content of which is incorporated herein by reference.

BACKGROUND OF THE INVENTION

Field of the Invention

This invention relates to a map generation apparatus configured to generate a map around a subject vehicle.

Description of the Related Art

Conventionally, there is a known apparatus in which white lines of a lane and a parking lot frame are recognized using an image captured by a camera mounted on a vehicle, and the recognition results of the white lines are used for vehicle driving control and parking support. Such an apparatus is described, for example, in Japanese Unexamined Patent Publication No. 2014-104853 (JP2014-104853A). In the apparatus disclosed in JP2014-104853A, edge points at which a change in luminance in the captured image is equal to or greater than a threshold is extracted, and the white lines are recognized based on the edge points.

In the apparatus described in JP2014-104853A, a white line is recognized for a lane on which a subject vehicle has actually traveled. Therefore, in order to generate a map including position information of the white line, it is necessary for the subject vehicle to actually travel in each lane, and it is difficult to efficiently generate the map.

SUMMARY OF THE INVENTION

An aspect of the present invention is a map generation apparatus including an electronic control unit including a microprocessor and a memory connected to the microprocessor. The microprocessor is configured to perform acquiring a map data of a first map for a current lane on which a subject vehicle travels, and generating a second map for an opposite lane opposite to the current lane by inverting the first map, based on the map data acquired.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention is explained with reference to FIGS. 1 to 4. A map generation apparatus according to an embodiment of the invention is applied to a vehicle having a self-driving capability, i.e., a self-driving vehicle, for example. The self-driving vehicle having the map generation apparatus may be sometimes called "subject vehicle" to differentiate it from other vehicles. The subject vehicle is an engine vehicle having an internal combustion engine (engine) as a travel drive source, electric vehicle having a travel motor as the travel drive source, or hybrid vehicle having both of the engine and the travel motor as the travel drive source. The subject vehicle can travel not only in a self-drive mode in which a driving operation by a driver is unnecessary, but also in a manual drive mode in which the driving operation by the driver is necessary.

Figure 1:
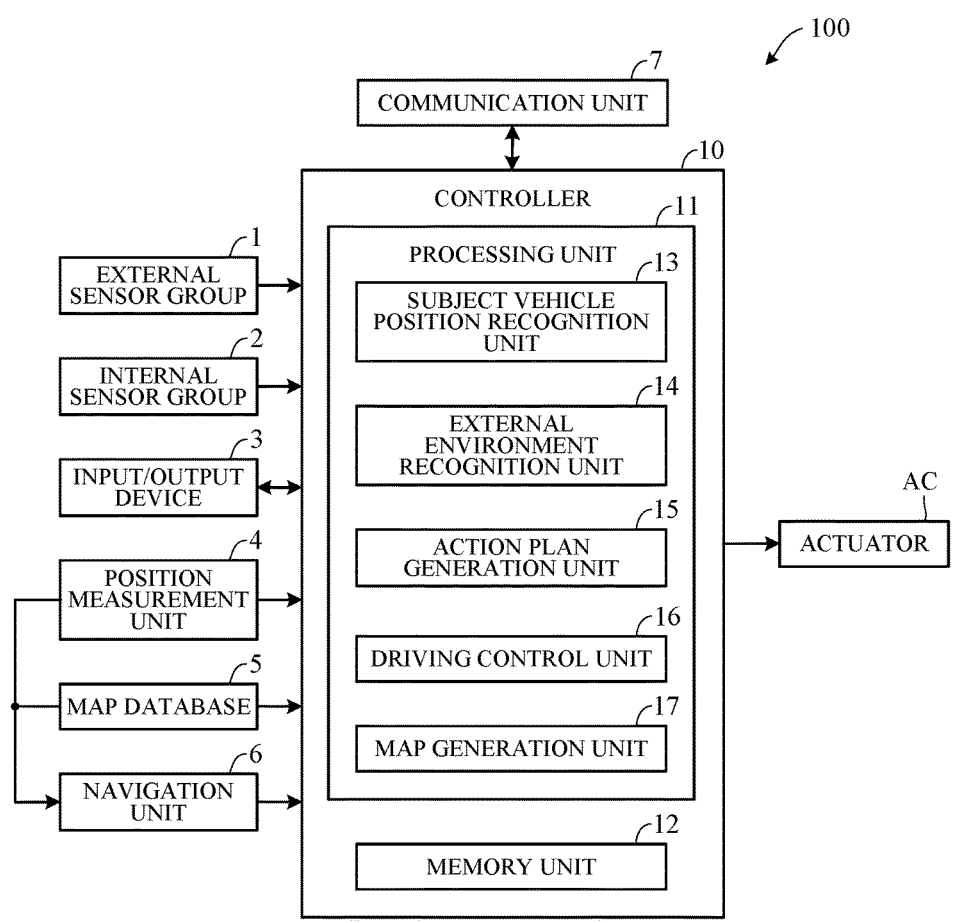
FIG. 1 is a block diagram schematically illustrating an overall configuration of a vehicle control system having a map generation apparatus according to an embodiment of the present invention.

First, the general configuration of the subject vehicle for self-driving will be explained. FIG. 1 is a block diagram schematically illustrating an overall configuration of a vehicle control system 100 of the subject vehicle having the map generation apparatus according to an embodiment of the present invention. As shown in FIG. 1, the vehicle control system 100 mainly includes a controller 10, and an external sensor group 1, an internal sensor group 2, an input/output device 3, a position measurement unit 4, a map database 5, a navigation unit 6, a communication unit 7 and actuators AC which are communicably connected with the controller 10.

The term external sensor group 1 herein is a collective designation encompassing multiple sensors (external sensors) for detecting external circumstances constituting subject vehicle ambience data. For example, the external sensor group 1 includes, inter alia, a LIDAR (Light Detection and Ranging) for measuring distance from the subject vehicle to ambient obstacles by measuring scattered light produced by laser light radiated from the subject vehicle in every direction, a RADAR (Radio Detection and Ranging) for detecting other vehicles and obstacles around the subject vehicle by radiating electromagnetic waves and detecting reflected waves, and a CCD, CMOS or other image sensor-equipped on-board cameras for imaging subject vehicle ambience (forward, reward and sideways).

The term internal sensor group 2 herein is a collective designation encompassing multiple sensors (internal sensors) for detecting driving state of the subject vehicle. For example, the internal sensor group 2 includes, inter alia, a vehicle speed sensor for detecting vehicle speed of the subject vehicle, acceleration sensors for detecting forward-rearward direction acceleration and lateral acceleration of the subject vehicle, respectively, rotational speed sensor for detecting rotational speed of the travel drive source, a yaw rate sensor for detecting rotation angle speed around a vertical axis passing center of gravity of the subject vehicle and the like. The internal sensor group 2 also includes sensors for detecting driver driving operations in manual drive mode, including, for example, accelerator pedal operations, brake pedal operations, steering wheel operations and the like.

The term input/output device 3 is used herein as a collective designation encompassing apparatuses receiving instructions input by the driver and outputting information to the driver. The input/output device 3 includes, inter alia, switches which the driver uses to input various instructions, a microphone which the driver uses to input voice instructions, a display for presenting information to the driver via displayed images, and a speaker for presenting information to the driver by voice.

The position measurement unit (GNSS unit) 4 includes a position measurement sensor for receiving signal from positioning satellites to measure the location of the subject vehicle. The positioning satellites are satellites such as GPS satellites and Quasi-Zenith satellite. The position measurement unit 4 measures absolute position (latitude, longitude and the like) of the subject vehicle based on signal received by the position measurement sensor.

The map database 5 is a unit storing general map data used by the navigation unit 6 and is, for example, implemented using a magnetic disk or semiconductor element. The map data include road position data and road shape (curvature etc.) data, along with intersection and road branch position data. The map data stored in the map database 5 are different from high-accuracy map data stored in a memory unit 12 of the controller 10.

The navigation unit 6 retrieves target road routes to destinations input by the driver and performs guidance along selected target routes. Destination input and target route guidance is performed through the input/output device 3. Target routes are computed based on current position of the subject vehicle measured by the position measurement unit 4 and map data stored in the map database 5. The current position of the subject vehicle can be measured, using the values detected by the external sensor group 1, and on the basis of this current position and high-accuracy map data stored in the memory unit 12, target route may be calculated.

The communication unit 7 communicates through networks including the Internet and other wireless communication networks to access servers (not shown in the drawings) to acquire map data, travel history information, traffic data and the like, periodically or at arbitrary times. In addition to acquiring travel history information, travel history information of the subject vehicle may be transmitted to the server via the communication unit 7. The networks include not only public wireless communications network, but also closed communications networks, such as wireless LAN, Wi-Fi and Bluetooth, which are established for a predetermined administrative area. Acquired map data are output to the map database 5 and/or memory unit 12 via the controller 10 to update their stored map data.

The actuators AC are actuators for traveling of the subject vehicle. If the travel drive source is the engine, the actuators AC include a throttle actuator for adjusting opening angle of the throttle valve of the engine (throttle opening angle). If the travel drive source is the travel motor, the actuators AC include the travel motor. The actuators AC also include a brake actuator for operating a braking device and turning actuator for turning the front wheels FW.

The controller 10 is constituted by an electronic control unit (ECU). More specifically, the controller 10 incorporates a computer including a CPU or other processing unit (a microprocessor) 11 for executing a processing in relation to travel control, the memory unit (a memory) 12 of RAM, ROM and the like, and an input/output interface or other peripheral circuits not shown in the drawings. In FIG. 1, the controller 10 is integrally configured by consolidating multiple function-differentiated ECUs such as an engine control ECU, a transmission control ECU and so on. Optionally, these ECUs can be individually provided.

The memory unit 12 stores high-accuracy detailed road map data (road map information) for self-driving. The road map information includes information on road position, information on road shape (curvature, etc.), information on gradient of the road, information on position of intersections and branches, information on type and position of division line such as white line, information on the number of lanes, information on width of lane and the position of each lane (center position of lane and boundary line of lane), information on position of landmarks (traffic lights, signs, buildings, etc.) as a mark on the map, and information on the road surface profile such as unevennesses of the road surface, etc. The map information stored in the memory unit 12 includes map information (referred to as external map information) acquired from the outside of the subject vehicle through the communication unit 7, and map information (referred to as internal map information) created by the subject vehicle itself using the detection values of the external sensor group 1 or the detection values of the external sensor group 1 and the internal sensor group 2.

The external map information is, for example, information of a map (called a cloud map) acquired through a cloud server, and the internal map information is information of a map (called an environmental map) consisting of point cloud data generated by mapping using a technique such as SLAM (Simultaneous Localization and Mapping). The external map information is shared by the subject vehicle and other vehicles, whereas the internal map information is unique map information of the subject vehicle (e.g., map information that the subject vehicle has alone). In an area in which no external map information exists, such as a newly established road, an environmental map is created by the subject vehicle itself. The internal map information may be provided to the server or another vehicle via the communication unit 7. The memory unit 12 also stores information such as programs for various controls, and thresholds used in the programs.

As functional configurations in relation to mainly self-driving, the processing unit 11 includes a subject vehicle position recognition unit 13, an external environment recognition unit 14, an action plan generation unit 15, a driving control unit 16, and a map generation unit 17.

The subject vehicle position recognition unit 13 recognizes the position of the subject vehicle (subject vehicle position) on the map based on position information of the subject vehicle calculated by the position measurement unit 4 and map information stored in the map database 5. Optionally, the subject vehicle position can be recognized using map information stored in the memory unit 12 and ambience data of the subject vehicle detected by the external sensor group 1, whereby the subject vehicle position can be recognized with high accuracy. The movement information (movement direction, movement distance) of the subject vehicle is calculated based on the detection value of the internal sensor group 2, thereby it is also possible to recognize the position of the subject vehicle. Optionally, when the subject vehicle position can be measured by sensors installed externally on the road or by the roadside, the subject vehicle position can be recognized with high accuracy by communicating with such sensors through the communication unit 7.

The external environment recognition unit 14 recognizes external circumstances around the subject vehicle based on signals from cameras, LIDERs, RADARs and the like of the external sensor group 1. For example, it recognizes position, speed and acceleration of nearby vehicles (forward vehicle or rearward vehicle) driving in the vicinity of the subject vehicle, position of vehicles stopped or parked in the vicinity of the subject vehicle, and position and state of other objects. Other objects include traffic signs, traffic lights, road, buildings, guardrails, power poles, commercial signs, pedestrians, bicycles, and the like. The other objects (road) also include road division lines (white lines, etc.) and stop lines. Recognized states of other objects include, for example, traffic light color (red, green or yellow) and moving speed and direction of pedestrians and bicycles. A part of a stationary object among other objects, constitutes a landmark serving as an index of position on the map, and the external environment recognition unit 14 also recognizes the position and type of the landmark.

The action plan generation unit 15 generates a driving path (target path) of the subject vehicle from present time point to a certain time ahead based on, for example, a target route computed by the navigation unit 6, map information stored in the memory unit 12, subject vehicle position recognized by the subject vehicle position recognition unit 13, and external circumstances recognized by the external environment recognition unit 14. When multiple paths are available on the target route as target path candidates, the action plan generation unit 15 selects from among them the path that optimally satisfies legal compliance, safe efficient driving and other criteria, and defines the selected path as the target path. The action plan generation unit 15 then generates an action plan matched to the generated target path. An action plan is also called "travel plan". The action plan generation unit 15 generates various kinds of action plans corresponding to overtake traveling for overtaking the forward vehicle, lane-change traveling to move from one traffic lane to another, following traveling to follow the preceding vehicle, lane-keep traveling to maintain same lane, deceleration or acceleration traveling. When generating a target path, the action plan generation unit 15 first decides a drive mode and generates the target path in line with the drive mode.

In self-drive mode, the driving control unit 16 controls the actuators AC to drive the subject vehicle along target path generated by the action plan generation unit 15. More specifically, the driving control unit 16 calculates required driving force for achieving the target accelerations of sequential unit times calculated by the action plan generation unit 15, taking running resistance caused by road gradient and the like into account. And the driving control unit 16 feedback-controls the actuators AC to bring actual acceleration detected by the internal sensor group 2, for example, into coincidence with target acceleration. In other words, the driving control unit 16 controls the actuators AC so that the subject vehicle travels at target speed and target acceleration. On the other hand, in manual drive mode, the driving control unit 16 controls the actuators AC in accordance with driving instructions by the driver (steering operation and the like) acquired from the internal sensor group 2.

The map generation unit 17 generates the environment map constituted by three-dimensional point cloud data using detection values detected by the external sensor group 1 during traveling in the manual drive mode. Specifically, an edge indicating an outline of an object is extracted from a camera image acquired by the camera based on luminance and color information for each pixel, and a feature point is extracted using the edge information. The feature point is, for example, an intersection of the edges, and corresponds to a road division line, a corner of a building, a corner of a road sign, or the like. The map generation unit 17 calculates the distance to the extracted feature point and sequentially plots the feature point on the environment map, thereby generating the environment map around the road on which the subject vehicle has traveled. The environment map may be generated by extracting the feature point of an object around the subject vehicle using data acquired by radar or LIDAR instead of the camera.

The subject vehicle position recognition unit 13 performs subject vehicle position estimation processing in parallel with map creation processing by the map generation unit 17. That is, the position of the subject vehicle is estimated based on a change in the position of the feature point over time. The map creation processing and the position estimation processing are simultaneously performed, for example, according to an algorithm of SLAM using signals from the camera or LIDAR. The map generation unit 17 can generate the environment map not only when the vehicle travels in the manual drive mode but also when the vehicle travels in the self-drive mode. If the environment map has already been generated and stored in the memory unit 12, the map generation unit 17 may update the environment map with a newly obtained feature point.

Figure 2A:
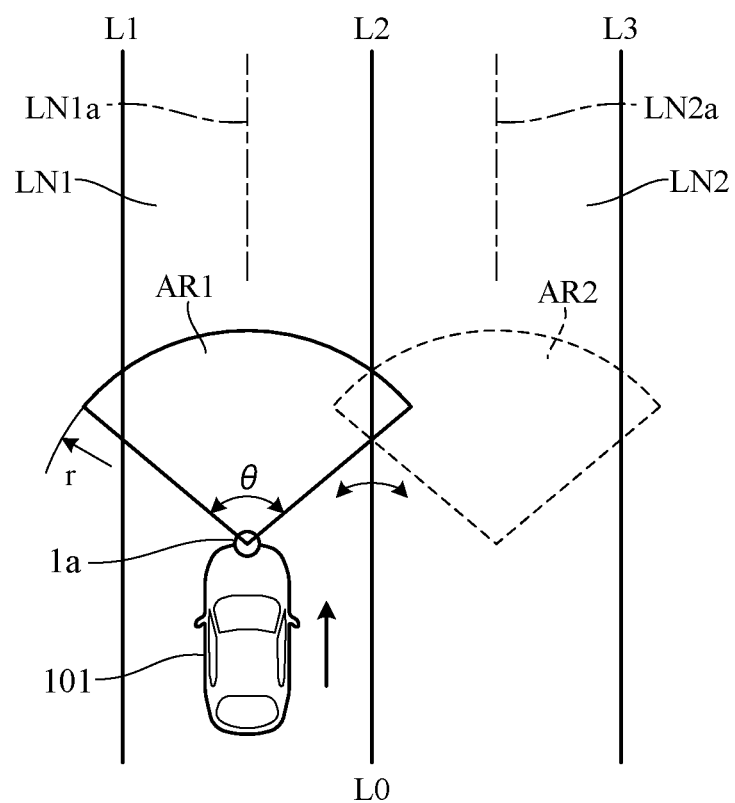
FIG. 2A is a view illustrating an example of a traveling scene to which the map generation apparatus according to the embodiment of the invention is applied.
Figure 2B:
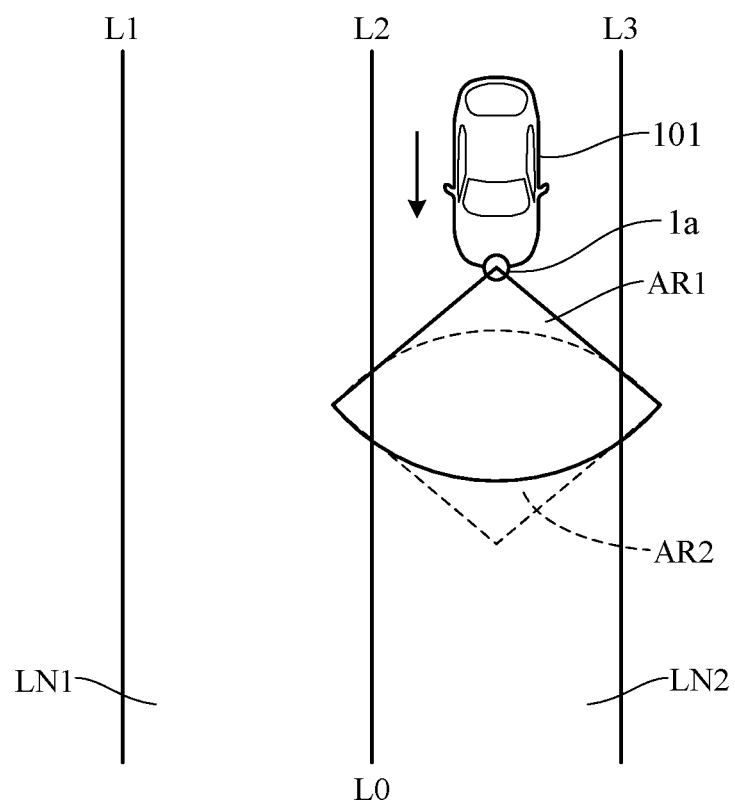
FIG. 2B is a view illustrating another example of a traveling scene to which the map generation apparatus according to the embodiment of the invention is applied.

A configuration of a map generation apparatus according to the present embodiment will be described. FIG. 2A is a diagram illustrating an example of a driving scene to which the map generation apparatus 50 is applied, and illustrates a middle of a scene in which a subject vehicle 101 travels from a point A (for example, home) to a point B (for example, a store) as the destination while generating an environmental map in a manual drive mode. FIG. 2B is a diagram illustrating another example of the driving scene to which the map generation apparatus 50 is applied, and illustrates a middle of a scene in which the subject vehicle 101 travels from the point B to the point A while generating the environmental map in the manual drive mode. That is, FIG. 2A illustrates a scene in which the vehicle travels on the outward path from the point A to the point B along the first lane LN1 surrounded by the division lines L1 and L2, and FIG. 2B illustrates a scene in which the vehicle travels on the return path from the point B to the point A along the second lane LN2 surrounded by the division lines L2 and L3.

The division lines L1 to L3 are lines such as white lines and yellow lines that define the lanes LN1 and LN2. The division line L2 is a boundary line L0 indicating the boundary between the lanes LN1 and LN2. More specifically, as illustrated in FIG. 2A, the boundary line L0 is a line (intermediate line) located at the center between a first center line LN1a extending along the first lane LN1 through the center in a vehicle width direction of the first lane LN1 (outward path) and a second center line LN2a extending along the second lane LN2 through the center in a vehicle width direction of the second lane LN2 (return path). Note that, for example, on a road having a median strip, there is the boundary line L0 between a division line on the inner side in the vehicle width direction (the side of the median strip) of the first lane LN1 and a division line on the inner side in the vehicle width direction (the side of the median strip) of the second lane LN2, and the division line L2 and the boundary line L0 may be different from each other.

FIGS. 2A and 2B illustrate an example in which the outward path and the return path are constituted by the single lanes LN1 and LN2, respectively, but the outward path and the return path may be constituted by a plurality of lanes, respectively. In this case, the boundary line L0 exists between the innermost lane of the outward path and the innermost lane of the return path in the vehicle width direction.

As illustrated in FIG. 2A, a camera 1a is mounted on a front portion of the subject vehicle 101. The camera 1a has a unique viewing angle θ determined by the performance of the camera and a maximum detection distance r. An inside of a fan-shaped area AR1 having a radius r and a central angle θ centered on the camera 1a is an area of an external space detectable by the camera 1a, that is, a detectable area AR1. The detectable area AR1 includes, for example, a plurality of division lines L1 and L2. Note that, in a case where a part of the viewing angle of the camera 1a is blocked by the presence of components disposed around the camera 1a, the detectable area AR1 is determined in consideration of blocking. By extracting edge points from a camera image, the positions of the division lines L1 and L2 in the detectable area AR1 can be recognized.

As described above, the subject vehicle 101 actually travels on the first lane LN1, so that position information of the division lines L1 and L2 of the first lane LN1 can be obtained on the basis of the camera image. As a result, it is possible to generate an environmental map of the outward path while traveling. Similarly, as illustrated in FIG. 2B, the subject vehicle 101 actually travels on the second lane LN2, so that the position information of the division lines L2 and L3 of the second lane LN2 can be obtained on the basis of the camera image. As a result, it is possible to generate the environmental map of the return path while traveling.

However, when the environmental maps for the outward path and the return path cannot be obtained until the vehicle actually travels on the outward path and the return path, respectively, the number of man-hours required for map generation increases, and map generation cannot be efficiently performed. In addition, when the vehicle travels on the outward path and then travels on the return path, in a case of a configuration where the environmental map of the return path is generated from the beginning, the processing load of the controller 10 increases, and a harmful effect due to the fact that efficient map generation cannot be performed occurs. Therefore, in order to enable efficient map generation, the present embodiment configures a map generation apparatus as follows.

Figure 3:
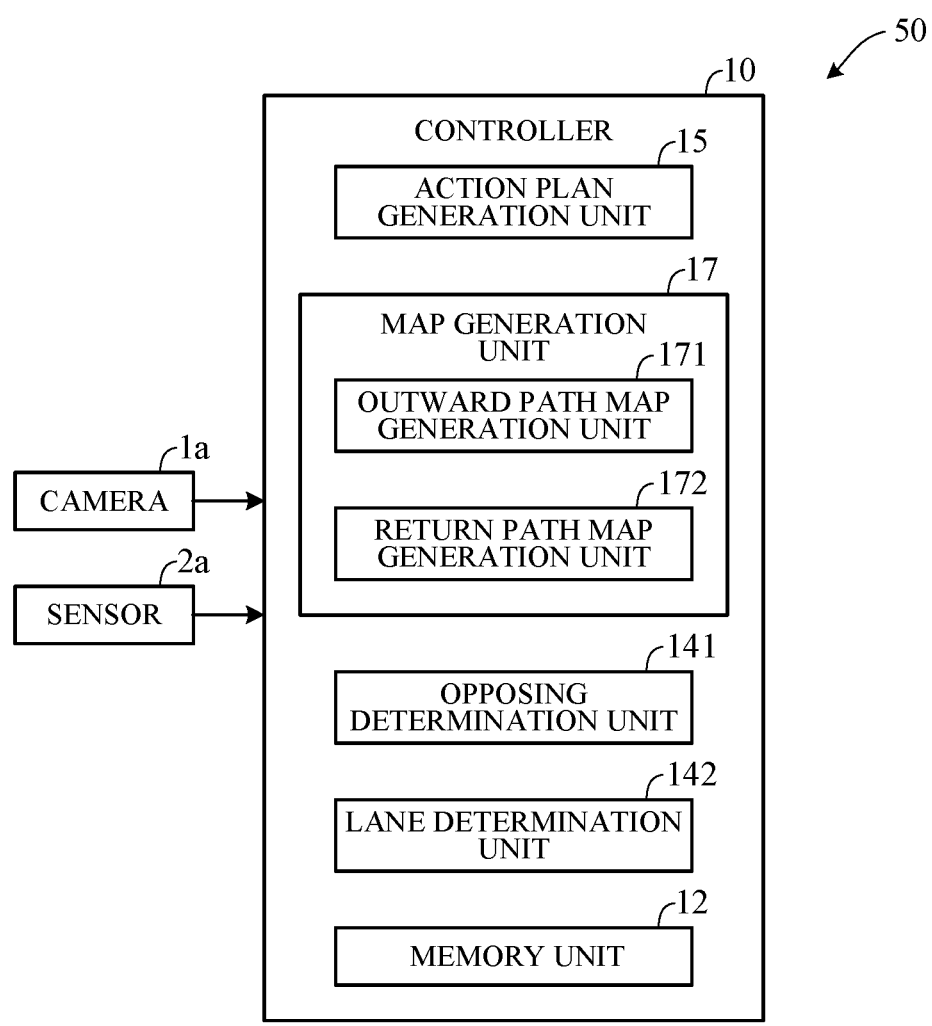
FIG. 3 is a block diagram illustrating a configuration of a substantial part of the map generation apparatus according to the embodiment of the invention.

FIG. 3 is a block diagram illustrating a main configuration of a map generation apparatus 50 according to the present embodiment. The map generation apparatus 50 constitutes a part of a vehicle control system 100 in FIG. 1. As illustrated in FIG. 3, the map generation apparatus 50 has a controller 10, a camera 1a, and a sensor 2a.

The camera 1a is a monocular camera having an imaging element (image sensor) such as a CCD or a CMOS, and constitutes a part of the external sensor group 1 in FIG. 1. The camera 1a may be a stereo camera. The camera 1a is attached to, for example, a predetermined position in the front portion of the subject vehicle 101 (FIG. 2A), continuously captures an image of a space in front of the subject vehicle 101, and acquires an image (camera image) of a target object. The target object includes a division line (for example, the division lines L1 and L2 in FIG. 2A) on a road. Note that the target object may be detected by a LiDAR or the like instead of the camera 1a or together with the camera 1a.

The sensor 2a is a detection part used to calculate a movement amount and a movement direction of the subject vehicle 101. The sensor 2a is a part of the internal sensor group 2, and includes, for example, a vehicle speed sensor and a yaw rate sensor. That is, the controller 10 (for example, a subject vehicle position recognition unit 13 in FIG. 1) calculates the movement amount of the subject vehicle 101 by integrating a vehicle speed detected by the vehicle speed sensor, calculates a yaw angle by integrating the yaw rate detected by the yaw rate sensor, and estimates a position of the subject vehicle 101 by odometry. For example, when the vehicle travels in the manual drive mode, the position of the subject vehicle is estimated by odometry when the environmental map is created. Note that the configuration of the sensor 2a is not limited thereto, and the position of the subject vehicle may be estimated using information of other sensor.

The controller 10 in FIG. 3 has an opposing determination unit 141 and a lane determination unit 142 in addition to an action plan generation unit 15 and a map generation unit 17, as a functional configuration of a processing unit 11 (FIG. 1). The opposing determination unit 141 and the lane determination unit 142 have a function for recognizing an external environment, and these units are included in the external environment recognition unit 14 in FIG. 1. The opposing determination unit 141 and the lane determination unit 142 also have a map generation function. Therefore, one or both of these units can also be included in the map generation unit 17.

The opposing determination unit 141 determines whether or not there is the return path (second lane LN2) adjacent to the outward path, that is, whether or not there is an opposite lane that extends parallel to the current lane on which the subject vehicle 101 travels and is opposite to the current lane, on the basis of the camera image acquired by the camera 1a during traveling on the outward path (first lane LN1). When the opposing determination unit 141 detects the presence of an oncoming vehicle traveling on the second lane LN2, the opposing determination unit 141 may determine that there is the opposite lane. The opposing determination unit 141 may be determined whether or not there is the opposite lane on the basis of information acquired via the communication unit 7 (FIG. 1).

The lane determination unit 142 determines whether or not the number of lanes on the outward path and the number of lanes on the return path are the same. For example, the number of lanes on the outward path is recognized from the camera image at the time of traveling on the outward path, and the recognized number of lanes is compared with the number of lanes on the return path recognized from the camera image at the time of traveling on the return path to determine whether or not these numbers of lanes are the same. The lane determination unit 142 may be determined whether or not the numbers of lanes are the same from the information acquired via the communication unit 7 (FIG. 1).

The map generation unit 17 has an outward path map generation unit 171 that generates an environmental map of an outward path (outward path map) and a return path map generation unit 172 that generates an environmental map of a return path (return path map). At the time of traveling on the outward path in the manual drive mode, the outward path map generation unit 171 extracts feature points of objects around the subject vehicle 101 on the basis of the camera image acquired by the camera 1a, and estimates the subject vehicle position by the sensor 2a, thereby generating the environmental map of the outward path. The generated outward path map is stored in the memory unit 12. The outward path map generation unit 171 recognizes the positions of the division lines L1 and L2 (FIG. 2A) in the detectable area AR1 of the camera 1a, and stores the division line information in map information (for example, internal map information).

At the time of traveling on the outward path in the manual drive mode, the return path map generation unit 172 generates the environmental map of the return path under a condition that a return path map generation condition is established. The return path map generation condition is established when it is determined by the opposing determination unit 141 that there is an opposite lane. On the other hand, when it is determined that the return path map generation condition is not established at the time of traveling on the outward path in the manual drive mode, the environmental map of the return path is not generated at the time of traveling on the outward path. In this case, at the time of traveling on the return path in the manual drive mode, similarly to the outward path map generation unit 171, the return path map generation unit 172 extracts feature points of objects around the subject vehicle 101 on the basis of the camera image, and estimates the subject vehicle position by the sensor 2a, thereby generating the environmental map of the return path. The generated return path map is stored in the memory unit 12.

When a return path map generation condition is established at the time of traveling on the outward path, the return path map generation unit 172 generates the return path map as follows. First, a boundary line L0 between the first lane LN1 and the second lane LN2 is set on the basis of the camera image. Next, an environmental map of the outward path is moved symmetrically with the boundary line L0 as a symmetry axis. That is, the outward path map is inverted bisymmetrically about the boundary line L0 by mirroring. As a result, as indicated by a dotted line in FIG. 2A, an environmental map of the return path in an area AR2 obtained by symmetrically moving the detectable area AR1 is obtained. The area AR2 includes the division lines L2 and L3 of the second lane LN2. Therefore, map information including division line information is obtained by mirroring. The return path map in this case is a simple map obtained by mirroring before the subject vehicle 101 travels on the return path, and corresponds to a temporary map. Information of the temporary map is stored in the memory unit 12.

After generating the temporary map, for example, at the time of traveling on the return path in the manual drive mode, when it is determined by the lane determination unit 142 that the number of lanes of the outward path and the number of lanes of the return path are the same, the return path map generation unit 172 updates the map information of the temporary map with the camera image obtained at the time of traveling on the return path. That is, as illustrated in FIG. 2B, the area AR2 in which the temporary map has been generated by mirroring overlaps with the detectable area AR1 of the camera 1a at the time of traveling on the return path. For this reason, the return path map generation unit 172 combines or matches map data based on the camera image obtained at the time of traveling on the return path with the map data of the temporary map, and updates the map information. The updated map information is stored in the memory unit 12.

The updated map is a complete environmental map of the return path, similarly to the environmental map obtained by the camera image at the time of traveling on the return path. However, at the time of traveling on the return path, since the temporary map of the return path is generated in advance, it is not necessary to generate the return path map from the beginning. Therefore, the return path map can be efficiently generated, and the processing load of the controller 10 is reduced. At the time of traveling on the return path, the vehicle can travel in the self-drive mode using the temporary map. In this case, the action plan generation unit 15 may set a target route of the subject vehicle 101 on the basis of the temporary map, and the driving control unit 16 may control the actuator AC so that the subject vehicle 101 automatically travels along the target route.

When it is determined by the lane determination unit 142 that the number of lanes of the outward path and the number of lanes of the return path are not the same at the time of traveling on the return path, the return path map generation unit 172 generates the environmental map of the return path on the basis of the camera image obtained at the time of traveling on the return path. That is, in this case, since the difference between the temporary map and the actual environmental map of the return path is considered to be large, the return path map is newly generated instead of updating (correcting) the temporary map. The generated return path map is stored in the memory unit 12. Note that, in generating the return path map, the position of the subject vehicle 101 may be corrected using a detection value of the sensor 2a on the basis of a predetermined lane position on the temporary map. That is, even when the numbers of lanes are different, the environmental map may be updated using the temporary map.

Figure 4:
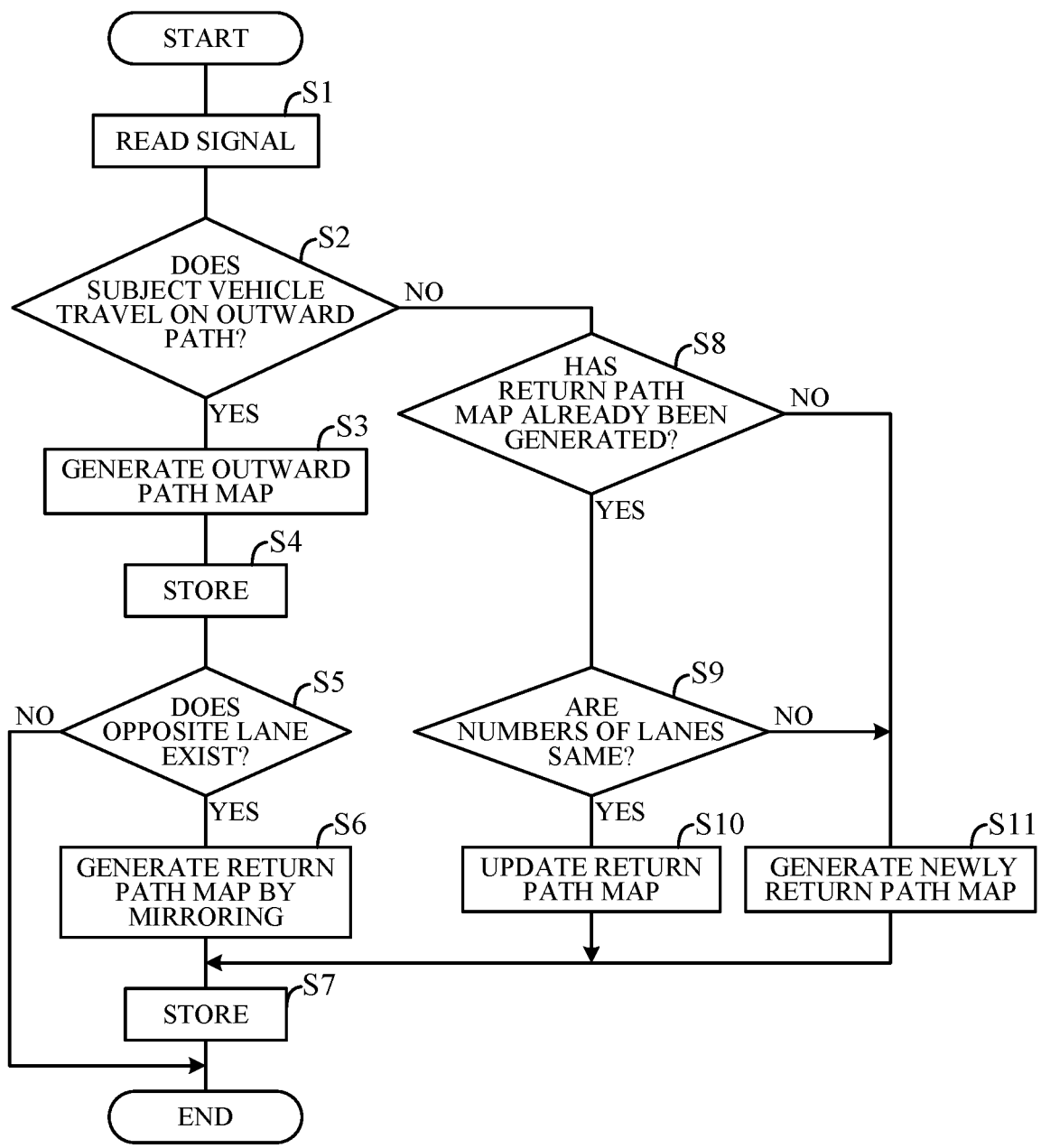
FIG. 4 is a flowchart illustrating an example of processing executed by a controller in FIG. 3.

FIG. 4 is a flowchart illustrating an example of processing executed by the controller 10 of FIG. 3 according to a predetermined program. The processing illustrated in the flowchart is started when the environmental map is generated by traveling in the manual drive mode, and is repeated at a predetermined cycle.

As illustrated in FIG. 4, first, signals from the camera 1a and the sensor 2a are read in S1 (S: processing step). Next, in S2, it is determined whether or not the vehicle travels on the outward path from the point A to the point B on the basis of the read signals. That is, it is determined whether or not the subject vehicle 101 travels on the first lane LN1. In a case where the result of determination in S2 is YES, the process proceeds to S3, and the environmental map of the outward path is generated on the basis of the camera image. Next, in S4, the outward path map generated in S3 is stored in the memory unit 12.

Next, in S5, it is determined whether or not there is an opposite lane (second lane LN2) on the basis of the camera image. In a case where the result of determination in S5 is YES, the process proceeds to S6, and in a case where the result of determination in S5 is NO, the process passes S6 and S7, and the processing ends. In S6, the return path map is generated by mirroring. For example, the return path map (temporary map) in the area AR2 indicated by a dotted line in FIG. 2A is generated. Next, in S7, information of the return path map is stored in the memory unit 12, and the processing ends.

On the other hand, in a case where the result of determination in S2 is NO, that is, when it is determined that the vehicle travels on the return path, the process proceeds to S8. In S8, it is determined whether or not the return path map has already been generated in S6. In a case where the result of determination in S8 is YES, the process proceeds to S9, and in a case where the result of determination in S8 is NO, the process proceeds to S11. In S11, an environmental map of the return path is generated on the basis of the camera image. That is, a return path map is newly generated. Next, in S7, information of the generated map is stored in the memory unit 12, and the processing ends.

In S9, it is determined whether or not the number of lanes of the outward path and the number of lanes of the return path are the same on the basis of the camera image. In a case where the result of determination in S9 is YES, the process proceeds to S10, and in a case where the result of determination in S9 is NO, the process proceeds to S11. In S10, the return path map generated in S6 is updated on the basis of the camera image. That is, as illustrated in FIG. 2B, the map information is updated by combining or matching the map data obtained from the camera image in the detectable area AR1 obtained at the time of traveling on the return path with the map data of the temporary map in the area AR2. Next, in S7, the updated map information is stored in the memory unit 12, and the processing ends.

The operation of the map generation apparatus 50 according to the present embodiment is summarized as follows. As illustrated in FIG. 2A, when the subject vehicle 101 travels on the outward path (first lane LN1) from the point A to the point B in the manual drive mode, an environmental map of the outward path in the detectable area AR1 of the camera 1a including the position information of the division lines L1 and L2 is generated on the basis of the camera image (S3). At this time, when it is determined that there is an opposite lane (second lane LN2) by, for example, detecting an oncoming vehicle traveling on the opposite lane, an environmental map (temporary map) of the return path within the area AR2 indicated by a dotted line in FIG. 2A is generated by mirroring of the outward path map (S6).

As a result, even before the vehicle actually travels on the return path in the manual drive mode, the return path map (temporary map) can be generated. In addition, it is possible to set a target route at the time of traveling on the return path in the self-drive mode on the basis of the temporary map, and traveling in the self-drive mode is possible. In addition, since mirroring is performed on the premise that there is the opposite lane, that is, mirroring is performed on the premise that there is the second lane LN2 similar to the first lane LN1, it is possible to prevent unnecessary mirroring processing.

After the temporary map of the return path is generated by the mirroring at the time of traveling on the outward path, as illustrated in FIG. 2B, when the vehicle travels on the return path (second lane LN2) from the point B to the point A in the manual drive mode, the environmental map of the return path within the detectable area AR1 of the camera 1a including the position information of the division lines L2 and L3 is generated on the basis of the camera image (S11). At this time, if the number of lanes of the outward path and the number of lanes of the return path are the same, instead of newly creating an environmental map, map data obtained from the camera image at the time of traveling on the return path is combined or matched with map data of the temporary map, and map information is updated (S10). As a result, it is easy to generate the return path map at the time of traveling on the return path, and it is possible to efficiently generate the return path map by reducing the processing load of the controller 10.

When the numbers of lanes are not the same, a difference between the temporary map and the environmental map obtained at the time of traveling on the return path is large. In this case, instead of updating the temporary map to generate the return path map, the return path map is newly generated on the basis of the camera image (S11). Therefore, it is not necessary to combine or match the maps more than necessary, and it is possible to efficiently generate the return path map.

According to the present embodiment, following functions and effects can be achieved.

(1) The map generation apparatus 50 includes a camera 1a that detects an external situation around the subject vehicle 101; an outward path map generation unit 171 that generates an outward path map on the basis of the external situation detected by the camera 1a when the subject vehicle 101 travels on the first lane LN1; and a return path map generation unit 172 that generates a return path map corresponding to a second lane LN2 opposite to the first lane LN1 by inverting the outward path map toward the second lane LN2 (FIG. 3). As a result, when the outward path map of the first lane LN1 on which the subject vehicle 101 travels is generated, the return path map of the second lane LN2 on which the subject vehicle 101 has not traveled yet can also be generated, and map generation can be efficiently performed.

(2) The return path map generation unit 172 generates the return path map by symmetrically moving (moving in a line-symmetric manner) the outward path map with a boundary line L0 between the first lane LN1 and the second lane LN2 as a symmetry axis (FIG. 2A). As a result, it is possible to favorably generate the return path map using the outward path map. That is, since the outward path and the return path are often formed symmetrically, the return path map can be generated favorably by mirroring.

(3) The map generation apparatus 50 further includes an opposing determination unit 141 that determines whether or not there is an opposite lane (second lane LN2) (FIG. 3). The return path map generation unit 172 generates the return path map under a condition that it is determined by the opposing determination unit 141 that there is the opposite lane (FIG. 4). As a result, it is possible to prevent unnecessary mirroring processing.

(4) After generating the return path map by inverting the outward path map, the return path map generation unit 172 updates the return path map on the basis of the external situation detected by the camera 1a when the subject vehicle 101 travels on the second lane LN2 (FIG. 4). As a result, the return path map generated in advance by mirroring is updated using the map information obtained when the vehicle actually travels on the second lane LN2, so that the accuracy of the return path map can be improved. In this case, information of the return path map generated by the mirroring is used instead of newly generating the return path map, so that the processing load of the controller 10 can be reduced.

(5) The map generation apparatus 50 further includes an action plan generation unit 15 that sets a target route when the subject vehicle 101 travels on the second lane LN2, on the basis of the return path map (temporary map) by mirroring generated by the return path map generation unit 172 (FIG. 3). This enables traveling in the self-drive mode even before traveling in the manual drive mode for generating the environmental map.

The above embodiment may be modified into various forms. Some modifications will be described below. In the above embodiment, the external situation around the subject vehicle 101 is detected by the external sensor group 1 such as the camera 1a. However, the external situation may be detected by using a detection device other than the camera 1a such as a LiDAR. In the above embodiment, the outward path map generation unit 171 generates the outward path map (first map) on the basis of the external situation detected by the camera 1a when the subject vehicle 101 travels on the first lane LN1 (current lane). That is, the subject vehicle 101 generates a first map while traveling on the outward path, and the map generation unit 17 acquires map data of the first map. However, the first map may be acquired from an external server device via the communication unit 7, for example. Therefore, the configuration of a data acquisition unit that acquires the map data of the first map is not limited to the above-described map generation unit.

In the above embodiment, when the subject vehicle 101 generates the outward path map while traveling on the first lane LN1, the presence or absence of the opposite lane (second lane LN2) is determined on the basis of the camera image. However, the presence or absence of the opposite lane may be determined by determining the presence or absence of the oncoming vehicle on the basis of information acquired via the communication unit 7, and the configuration of an opposing determination unit is not limited to the configuration described above. In the above embodiment, the presence of the opposite lane is set as the return path map generation condition, and the return path map generation unit 172 generates the return path map by mirroring. However, other conditions may be included in the return path map generation condition. For example, the number of lanes of the outward path and the number of lanes of the return path that are the same may be included in the return path map generation condition. Therefore, a map generation unit may have any configuration as long as the second map for the opposite lane is generated by inverting the first map. The inversion mode is not limited to line symmetry with the boundary line as a symmetry axis.

In the above embodiment, after generating the return path map by mirroring, the return path map generation unit 172 updates the return path map on the basis of the external situation detected by the camera 1a when the subject vehicle 101 travels on the second lane LN2 under the condition that the number of lanes of the outward path and the number of lanes of the return path are the same. However, the return path map may be updated regardless of whether or not the numbers of lanes are the same. In the above embodiment, the action plan generation unit 15 as a route setting unit sets the target route for self-driving in traveling on the return path using the temporary map generated by the mirroring. However, the target route for self-driving may be set using an updated return path map (complete map) instead of the temporary map.

In the above embodiment, the example in which the map generation apparatus is applied to the self-driving vehicle has been described. That is, the example in which the self-driving vehicle generates the environmental map has been described. However, the present invention can be similarly applied to a case where a manual driving vehicle having or not having a driving support function generates the environmental map.

The present invention can also be used as a map generation method including acquiring a map data of a first map for a current lane LN1 on which a subject vehicle 101 travels, and generating a second map for an opposite lane LN2 opposite to the current lane LN1 by inverting the first map, based on the map data acquired.

The above embodiment can be combined as desired with one or more of the above modifications. The modifications can also be combined with one another.

According to the present invention, it is possible to generate a map for a lane on which a subject vehicle has not traveled yet, and a map generation can be efficiently performed.

Above, while the present invention has been described with reference to the preferred embodiments thereof, it will be understood, by those skilled in the art, that various changes and modifications may be made thereto without departing from the scope of the appended claims.

What is claimed is:

1. A map generation apparatus, comprising
an electronic control unit including a microprocessor and a memory connected to the microprocessor, wherein
the microprocessor is configured to perform:
acquiring map data of a first map for a current lane on which a subject vehicle travels; and
generating a second map for an opposite lane opposite to the current lane by inverting the first map, based on the map data acquired, and
the microprocessor is configured to perform
the generating including setting a line passing through a middle position between a first center line extending along the current lane through a center in a width direction of the current lane and a second center line extending along the opposite lane through a center in the width direction of the opposite lane as a symmetry axis, and generating the second map by symmetrically moving the first map with the symmetry axis.

2. The map generation apparatus according to claim 1, wherein
the microprocessor is configured to further perform determining whether the opposite lane exists, and
the microprocessor is configured to perform
the generating including generating the second map when it is determined that the opposite lane exists.

3. The map generation apparatus according to claim 1, further comprising
a detection device that detects an external situation around the subject vehicle, wherein
the microprocessor is configured to perform
the generating including generating the first map based on the external situation detected by the detection device when the subject vehicle travels on the current lane, and
the acquiring including acquiring the map data of the first map generated based on the external situation detected by the detection device.

4. The map generation apparatus according to claim 3, wherein
the microprocessor is configured to perform
the generating including updating the second map based on the external situation detected by the detection device when the subject vehicle travels on the opposite lane after generating the second map by inverting the first map.

5. The map generation apparatus according to claim 4, wherein
the microprocessor is configured to further perform determining whether a number of lanes for a return path including the opposite lane is equal to a number of lanes for an outward path including the current lane, and
the microprocessor is configured to perform
the generating including updating the second map generated during traveling in the outward path based on the external situation detected by the detection device during traveling in the return path when it is determined that the number of the lanes for the return path is equal to the number of the lanes for the outward path during traveling in the return path, while newly generating the second map based on the external situation detected by the detection device during traveling in the return path without using the second map generated during traveling in the outward path when it is determined that the number of the lanes for the return path is not equal to the number of the lanes for the outward path during traveling in the return path.

6. The map generation apparatus according to claim 3, wherein
the microprocessor is configured to perform
the generating including generating the first map and generating the second map by inverting the first map when the subject vehicle travels on the current lane.

7. The map generation apparatus according to claim 1, wherein
the microprocessor is configured to further perform
setting a target route when the subject vehicle travels on the opposite lane, based on the second map.

8. A map generation method, comprising
acquiring map data of a first map for a current lane on which a subject vehicle travels; and
generating a second map for an opposite lane opposite to the current lane by inverting the first map, based on the map data acquired, and
the generating includes setting a line passing through a middle position between a first center line extending along the current lane through a center in a width direction of the current lane and a second center line extending along the opposite lane through a center in the width direction of the opposite lane as a symmetry axis, and generating the second map by symmetrically moving the first map with the symmetry axis.

* * * * *